United States Patent

[11] 3,584,853

| [72] | Inventor | William A. Munson |
| | | Williamsville, N.Y. |
| [21] | Appl. No. | 766,785 |
| [22] | Filed | Oct. 11, 1968 |
| [45] | Patented | June 15, 1971 |
| [73] | Assignee | Westinghouse Electric Corporation |
| | | Pittsburgh, Pa. |

[54] TRACKING SYSTEM FOR STRIP PROCESSING LINES
6 Claims, 2 Drawing Figs.

| [52] | U.S. Cl. | 266/3, |
| | | 33/134, 72/15, 72/17, 226/113, 226/118 |
| [51] | Int. Cl. | C21d 9/56 |
| [50] | Field of Search | 72/14, 15, |
| | | 17; 33/129, 132, 134; 266/3, 3 P, 113, 118 |

[56] References Cited
UNITED STATES PATENTS

| 2,306,750 | 12/1942 | Rendel | 266/3 |
| 2,761,986 | 9/1956 | Wald et al. | 33/134 |
| 2,869,241 | 1/1959 | Witt | 72/11 |
| 3,058,223 | 10/1962 | Schmidt et al. | 33/129 |
| 3,182,402 | 5/1965 | Klager | 33/132 |
| 3,406,601 | 10/1968 | Clifford | 33/132 |
| 3,411,216 | 11/1968 | Evans et al. | 33/129 |

*Primary Examiner*—Gerald A. Dost
*Attorneys*—F. H. Henson, R. G. Brodahl, M. F. Oglo and E. F. Possessky ABSTRACT: Described is a system for tracking one or more welds or other specific points on strip material passing through a continuous processing line containing one or more loop storage areas in which the length of material may increase or decrease. Determination of the length of material in loop storage is made by counting up a storage counter in reference to the movement of the strip material introduced into the loop and down counting the same counter for strip material paid out of the loop. This quantity is then used to track the position of the point in the processing line.

TRACKING SYSTEM FOR STRIP PROCESSING LINES

BACKGROUND OF THE INVENTION

In many continuous processing lines for steel strip material or the like, it is necessary to weld or otherwise connect the trailing end of one length of strip material to the leading end of the next succeeding length to be processed. After processing the lengths are again severed by a shear. If the material being processed comprises steel strip passing through a temper mill, for example, it is necessary to separate the rolls of the temper mill as the weld approaches the bite of the rolls. Otherwise, the surface of the rolls would be damaged by the weld. Also, it is necessary to determine when the weld approaches the shear at the end of the processing line in order that the strip can be decelerated and a shearing operation performed.

Similarly, in a pickle line for steel strip material, lengths of strip of different widths are welded end to end and passed through the line. In such a processing line, the position of the weld must be tracked in order to separate side guides for the pickle tanks as the weld, possibly indicating a change in width of the strip, approaches the pickle tank.

In processing lines of the type described above, the material passes through the processing equipment continuously; however it must be stopped, or at least decelerated, periodically at the ends of the line for welding and shearing, respectively. As a result, loop storage areas are employed in the line where material enters or leaves one end of the area continuously, but is intermittently fed into or paid out of the other end. As will be appreciated, the length of the strip material in storage will vary, but this length in storage must be determined continually in order to track the position of the weld or other point of interest.

In the past, the amount of material in loop storage was derived by determining the basic position of each end of a looping car or storage tower. It was then assumed that this meant a certain amount of material was in storage. As the ends of the storage unit changed, the value displayed or retained for loop storage purposes was modified depending upon which direction the tower or car moved. Then, upon command that a weld had been made, this number was taken from storage and down counted for the purpose of attempting to keep an exact position, footagewise, of the weld in relation to some device or operation behind the storage area. Thus, the entire system was tied to the position of the storage car rather than the strip itself. As a result, such tracking systems were not very accurate and not altogether satisfactory.

SUMMARY OF THE INVENTION

As an overall object, the present invention seeks to provide a tracking system of the type described which enables determination of the length of strip in storage more accurately than prior art systems of this type. This is due to the fact that the strip itself is measured rather than a change in position of a storage car or the like.

Another object of the invention is to provide a tracking system for welds or other points on strip material wherein the length of strip in storage, determined by an up-down counter, is transferred to a main down counter and this value is decreased as material is paid out of the storage loop into the system.

Still another object of the invention is to provide a weld-tracking system wherein two or more welds can be tracked simultaneously. That is, it is not necessary to wait until one weld passes through the entire processing system before the next succeeding weld can be tracked.

In accordance with the invention, a tracking system for a processing line having a loop storage area is provided including two tachometer pulse generators at the entrance and exit ends of the loop storage area which drive through a coincident pulse cancellation means to an up-down counter for keeping track of strip in storage. The value of the strip in storage is then transferred to a down counter and this value is decreased as material is paid out of storage into the system, thereby determining the point at which the weld leaves the storage area and approaches the bite of the rolls of a temper mill, for example.

Further, in accordance with the invention, the position of a weld with respect to a delivery shear may be determined in a processing line wherein the material passes through an entrance loop storage area, then through a processing device such as a temper mill or pickle tank, and finally through an exit loop storage area before it reaches the shear. This is accomplished by causing the aforesaid down counter to develop a command signal when the weld, as tracked by the down counter, is at a predetermined distance from the shear, not counting the material in the exit loop storage area. This value is then added to the value established by a second up-down counter arrangement which determines the length of material in the second exit loop storage area. The sum of the two values is then preset into a second down counter which, when it has counted down to zero, will indicate that the weld has reached the delivery shear.

In order to track two or more welds simultaneously, other sets of down counters are provided to perform the same functions as the first two down counters when a weld is made during the interval that the first two down counters are occupied.

The above and other objects and features of the invention will become apparent from the following detailed description taken in connection with the accompanying drawings which form a part of this specification, and in which:

DESCRIPTION OF ONE PREFERRED EMBODIMENT

Figure 1:
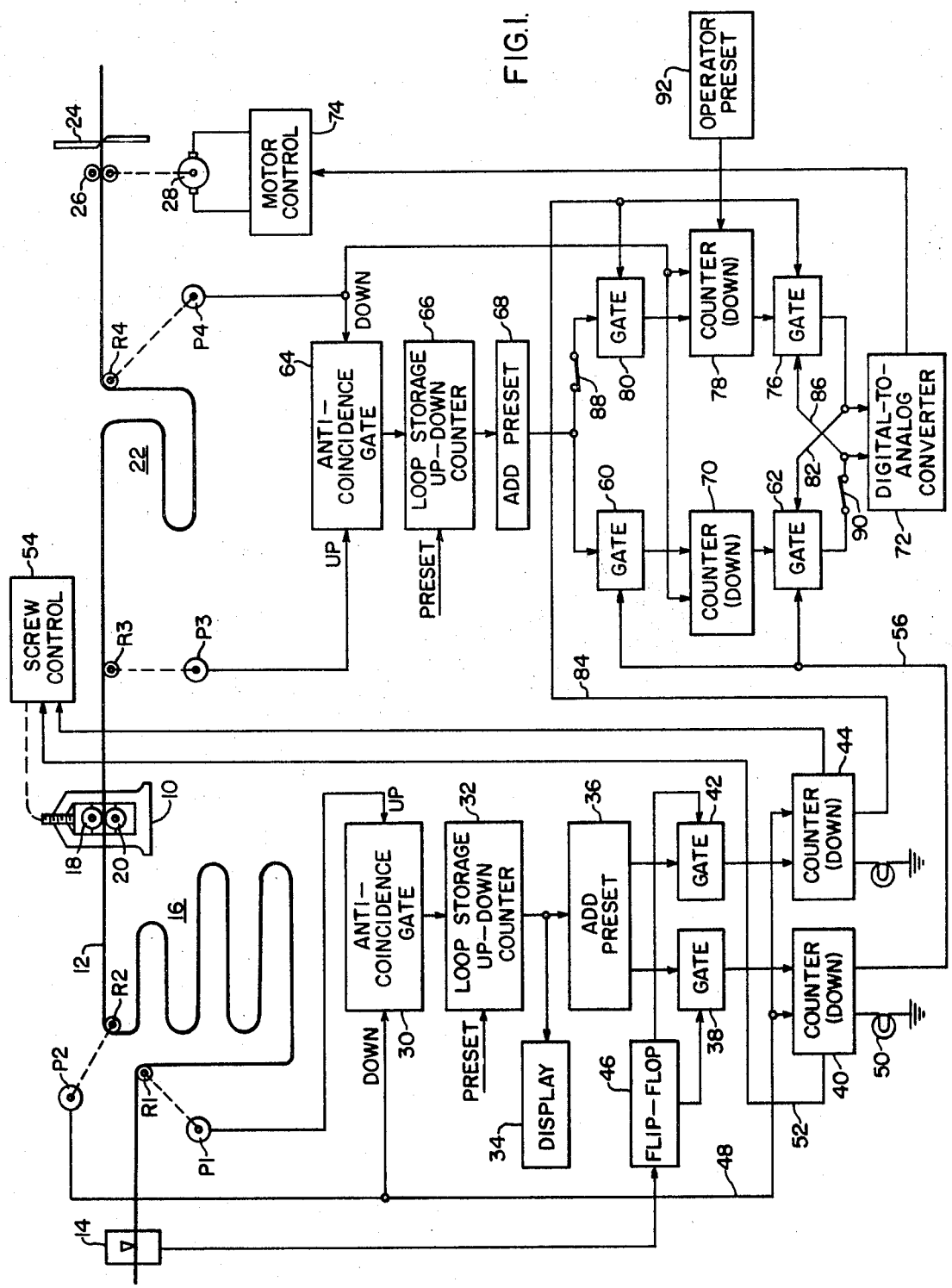
FIG. 1 is a schematic diagram of one embodiment of the invention as applied to a weld-tracking system for a temper mill installation.

With reference now to the drawings, and particularly to FIG. 1, a temper mill 10 is shown through which there is passed strip material 12. As shown, the strip material initially passes through a welder 14 where the trailing end of one length of the strip material 12 is welded to the leading end of the next succeeding length of material to be processed. From the welder 14, the strip material 12 passes around roll R1 and thence to an entrance loop storage area, generally indicated at 16. From the loop storage area 16, the material passes over roll R2 and then between the rolls 18 and 20 of the temper mill 10. From mill 10, the material passes over roll R3 and thence into an exit loop storage area, generally indicated by the reference numeral 22. Strip issuing from the loop storage area 22 then passes around roll R4 to exit or delivery shears 24, the material being advanced from the loop storage area 22 by means of pinch rolls 26 or the like driven by motor 28.

As will be understood, the strip material 12 passes through the temper mill 10 continuously; however, it must be stopped at the welder 14 and stopped, or at least decelerated, during a shearing operation by the exit shear 24. As a result, it becomes necessary to employ the loop storage area 16 and 22. That is, the material is stored in the area 16 in order that it can be continuously fed through the temper mill 10, notwithstanding the fact that the trailing end of the material may be momentarily stopped at the welder 14. Similarly, the loop storage area 22 enables storage of the material continuously issuing from the temper mill 10 during the time that a shearing operation is being performed. Ordinarily, the material will be sheared at approximately the same point at which it was welded by the welder 14.

As shown, the roll R1 is connected to a tachometer pulse generator P1 at the entrance to the loop storage area 16, while the roll R2 at the exit end of the loop storage area 16 is connected to a second tachometer pulse generator P2. The outputs of the two pulse generators P1 and P2 are fed through an anticoincidence gate 30 to an up-down loop storage counter 32. The purpose of the anticoincidence gate, of course, is to prevent any ambiguity when up-and-down pulses from the generators P1 and P2 are being fed to the counter 32 at the same time. When simultaneous up-and-down pulses are canceled, the effect is the same as it would be if both were fed to the counter 32 in succession. The counter 32 may be preset initially when a known length of material is stored in the area 16.

With the arrangement shown, the count stored in the counter 32 will, at all times, be an indication of the length of the material stored in the loop storage area 16. That is, as material issues from the loop storage area 16, pulses from generator P2 will cause the counter 32 to count down to compensate for the reduction in stored material. On the other hand, when the material is fed into the loop storage area 16, the pulse generator P1 will cause the counter 32 to count up, indicating an increase in stored material. The output of the up-down counter 32 is displayed in a suitable display device 34. Added to the count of pulse counter 32 in circuit 36 is a number equal to (1) the distance between the welder 14 and roll R1, plus (2) the distance between roll R2 and the temper mill 10, plus (3) a fixed distance past the temper mill 10. This preset number can then be applied through gate circuit 38 to down counter 40 or through gate circuit 42 to down counter 44.

Each time a weld is made by the welder 14, it actuates a flip-flop 46 to change its stable states. Under one stable state, the gate 38 is enabled to pass the preset count to counter 40; and when the flip-flop 46 is in its other stable state, the gate 42 is enabled to pass the preset count to the down counter 44.

Let us assume, for example, that gate 38 is enabled and that when a weld is made, a number is preset into the down counter 40 which will represent the total distance that the weld is now ahead of a fixed distance past the temper mill 10. As the strip 12 is paid out of loop storage area 16 and sent through the temper mill 10, the pulse generator P2 will produce a pulse for each incremental length of material passing it. These pulses are presented to the down counter 40 via lead 48, causing it to reduce its count by one for each pulse given to it from the pulse generator P2, thus keeping track of the position of the weld as it approaches the temper mill 10.

When the weld is at a fixed distance from the temper mill, for example 100 feet, a signal will be generated by the down counter 40 which energizes a lamp 50 to show that the weld is approaching the temper mill. At the same time, the down counter 40 will produce a signal on lead 52 which is applied to the screw control 54 for temper mill 10, thereby causing the rolls 18 and 20 to separate. The amount of mill screw opening will be that required to decrease the temper mill draft, for example, from 5 percent to 1 percent. Upon the weld itself clearing the temper mill rolls, the screw control circuit 54 will automatically cause the screws to return to their original position. Thus, at this point, the weld has passed through the temper mill 10 and is on the right side of the mill as viewed in FIG. 1.

When the weld, as tracked by the down counter 40, reaches a position where it is a predetermined distance from the delivery shear 24 (800 feet, for example), but not counting the material stored in the exit storage loop 22, a signal will be produced by the down counter 40 on lead 56 which enables gates 60 and 62.

The outputs of pulse generators P3 and P4 are applied through an anticoincidence gate 64 to an up-down counter 66 for the exit loop storage area 22. The up-down counter 66 operates in generally the same manner as counter 32 and gives a continual indication of the amount of material stored in the exit loop 22. That is, as material is fed into the loop, up pulses generated by generator P3 are fed to the counter 66; and as material issues from the loop 22, down pulses from the generator P4 cause the counter 66 to count down.

The count from counter 66 is then applied to circuit 68 where a count is added equal, for the given example, to 800 feet. This compensates for the distance that the weld is from the delivery shear 24 when the signal is produced on lead 56 by counter 40. When gate 60 is enabled, the count from counter 66 representing the amount of material in exit storage loop 22 plus a count equal to 800 feet is applied to down counter 70 as a preset. Upon being preset, the counter 70 will start down counting by virtue of pulses applied thereto from pulse generator P4. The output from counter 70 is fed through gate 62, which is now enabled, to a digital-to-analog converter 72 to obtain an analog output equal to the distance that the weld is from the shear. That is, as the down counter 70 counts down, the analog output of circuit 72 gradually decreases. The output signal from the digital-to-analog converter is then applied to a motor control circuit 74 for drive motor 28 to initiate line slowdown for shearing purposes as a function of line speed. Upon achieving a count of zero, the counter 70 will gate itself off and thereby enable gate 76, thereby turning control for the digital-to-analog converter 72 over to a down counter 78 operative through gate 80 with circuit 68 and up-down counter 66. The gate 62 is operative such that it will not be enabled in the absence of signals on both of the leads 56 and 82, for example, and the gate 76 is similarly operative with leads 84 and 86.

Let us assume, now, that a second weld is made by the welder 14 either before or after the preceding weld has passed to the delivery shear 24. The flip-flop 46 will now reverse its stable states of conduction; and the amount of material in the entrance loop storage area 16 plus a constant, equaling the total distance that the weld is now ahead of a fixed distance past the temper mill, will be applied to down counter 44. Down counter 44 will now begin counting down by virtue of pulses from generator P2 on lead 48 until the weld, as tracked by counter 44, reaches a position equal to a predetermined distance from the shear 24, not counting the material stored in the exit storage loop 22. The operation of the down counter 78 is the same as that for counter 70; and when gate 76 is enabled by virtue of signals on lead 84 and 86, indicating that the previous weld has now passed the shear 24, the down counter 78 will now control the digital-to-analog converter and, hence, the drive motor 28.

The foregoing description of the operation of counters 70 and 78 assumed that shearing was to be performed as a function of the detection of a weld. If, however, shearing is to occur as a result of strip length as determined by the operator, switches 88 and 90 will be opened. Opening of switch 88 prevents the counter 78 from ever receiving any information from the up-down loop storage counter 66; while opening of switch 90 prevents counter 70 from ever supplying any information to the digital-to-analog converter 72.

The counter 78 can now be preset to a given length of feet by an operator preset circuit 92 which may, for example, comprise a five-decade selector switch. As the strip passes roll R4, the pulse generator P4 will produce output pulses causing the counter 78 to count down. As the counter counts down, and assuming that counter 44 is in operation, its count will be converted into an analog signal by circuit 72, thereby initiating line slowdown in the normal fashion as for weld shearing. Line stopping, to enable shearing, will be under the control of counter 78 under these circumstances by suitable and well known control means, not shown, upon the counter 78 reaching zero. At this point, the strip movement will be instructed to stop and the shear 24 to operate.

The loop storage counters 32 and 66 keep track of material fed into the respective loops 16 and 22. Upon control system initiation, the basic loop storage counters will be preset to a number which will correspond to a specific number of feet of loop depending upon the loop cars being at a required initiating position. From then on, as the car is changed, the amount of material in the loop will be determined by keeping track of material entering and leaving the loop storage areas.

Figure 2:
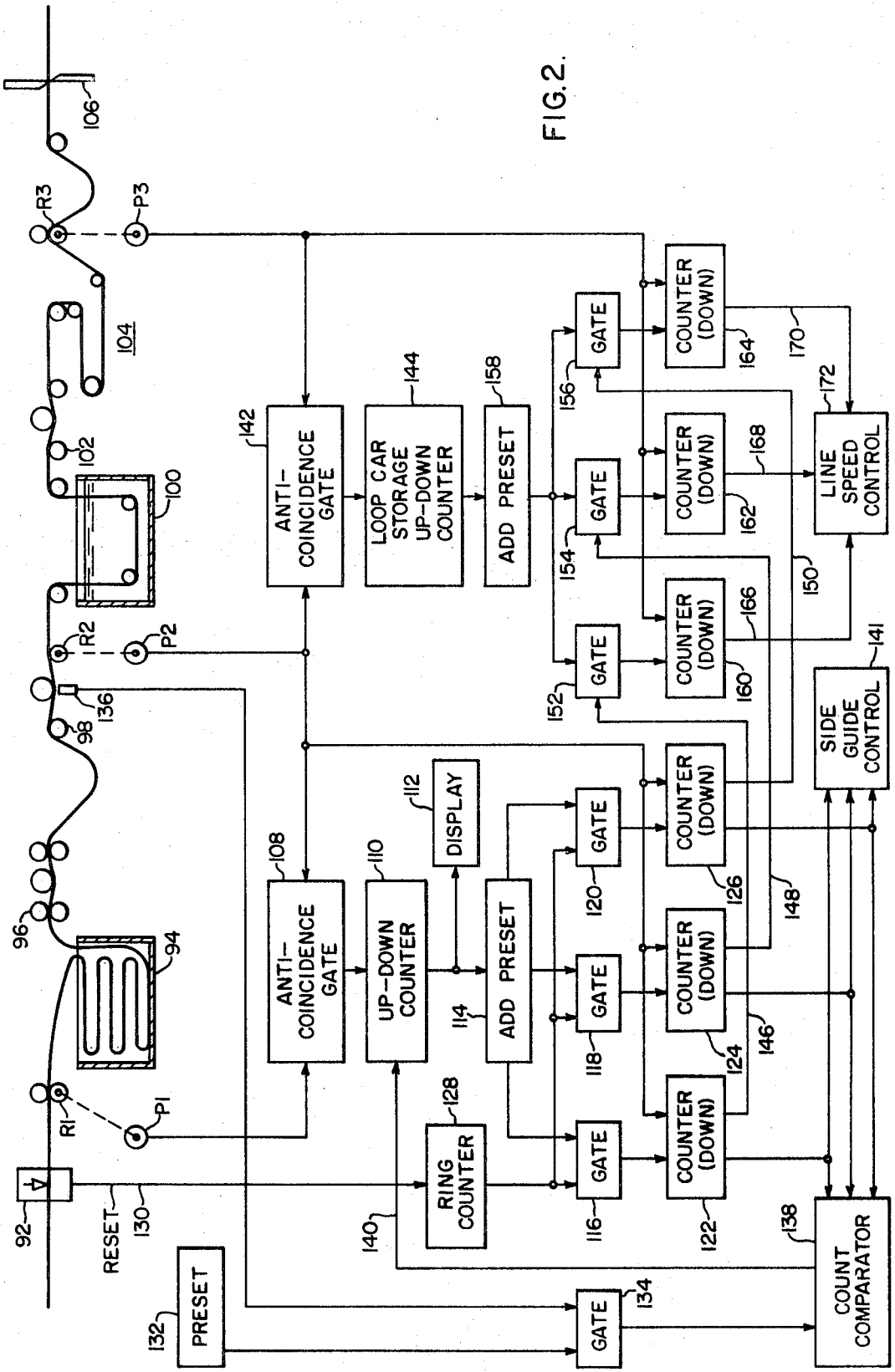
FIG. 2 is a schematic illustration of another embodiment of the invention as applied to a weld-tracking system for a pickle line.

With reference now to FIG. 2, another embodiment of the invention is shown as applied to a pickling line for steel strip material. In this case, however, means are employed to compare the number in the loop storage system against a known quantity and to cause the loop storage counter to correct for any discrepancy discovered. This then permits the system to correct for any slippage in tachometer rolls, gearing ratios which are not exact, wear in the tachometer rolls, and the like.

The system shown in FIG. 2 includes a welder 92, and punch which punches a hole in the strip at the point at which the weld is made or otherwise places a mark on the strip which can be optically detected. From the welder 92, the strip passes over roll R1 and thence into a wet loop storage area 94. From storage area 94, the strip passes through rolls 96, over roll 98 and over roll R2. From roll R2, the strip then passes into the pickling tank 100 and thence over and under rolls 102 to a loop car, schematically illustrated at 104. From loop car 104, the strip then passes over roll R3 to delivery shears 106.

The rolls R1, R2 and R3 are connected to tachometer pulse generators P1, P2 and P3, respectively. These correspond to the pulse generators shown in FIG. 1, except that the functions of pulse generators P2 and P3 in FIG. 1 are both performed by the pulse generator P2 in FIG. 2.

The pulses from generators P1 and P2 are fed to an anticoincidence gate 108, and then to an up-down counter 110 which determines the amount of material stored in the loop storage area 94. This number is displayed on display means 112 and fed to add preset circuit 114, where a number is added such that the output of circuit 114 represents the total distance that the weld is ahead of a fixed point at the pickle tank 100. The output of circuit 114 can then be applied to any one of gates 116, 118 or 120 and associated down counters 122, 124 or 126, respectively. The gates 116, 118 and 120, in turn, are enabled in sequence by means of a ring counter 128 driven by pulses on lead 130 produced each time a weld is made and a hole is punched in the strip. Thus, after the first weld is made, gate 116 is enabled, after the second weld is made, gate 118 is enabled, after the third weld is made, gate 120 is enabled, and so on. As should be readily understood, the number of gates can be extended if desired to handle any number of welds progressing through the pickling line. The output of counter preset circuit 132 is fed to a gate circuit 134 which is enabled whenever a photocell 136 detects a punched hole in the strip. Let us assume, for example, that a hole has been punched in the strip and that the hole progresses to the location of photocell 136. When photocell 136 enables gate 134, the known value of preset 132 is transferred to a count comparator 138 where it is compared with the count of down counter 122, 124 or 126. If the count of counter 122, for example, does not correspond with that of preset 132, a correction signal is produced by count comparator 138 on lead 140. This correction signal is then applied to the up-down counter 110 to correct for any inaccuracies in the number representing the amount of material in the wet loop storage area 94. As was explained above, these inaccuracies can occur due to slippage of the tachometer rolls, wear or other factors.

When any one of the down counters 122, 124 or 126 achieves a fixed distance from the pickle tank 100, a side guide control circuit 141 coupled to the respective counters 122, 124 and 126 generates a signal to indicate that the weld is approaching the pickle tank 100 and instructs the side guides (not shown) for the strip material to open wide enough to permit the weld to pass through the line. As was explained above, it often occurs that in a pickle line of this type, lengths of strip of different widths are welded together end to end. If the side guides are not opened in this manner, it is possible that the strip would jam, particularly when a length of strip of greater width is welded to the trailing end of a strip of lesser width.

The outputs of the pulse generators P2 and P3 are applied through an anticoincidence gate 142 to a second up-down counter 144 for the loop car storage area 104. The number stored in the counter 144, therefore, will be proportional to the length of the material stored in the loop car storage area 104. When the weld, as tracked by counter 122, 124 or 126 reaches a position equal to a predetermined number of feet from the delivery shear 106, not counting the material stored in the delivery loop car storage area 104, a command signal will be generated on lead 146, 148 or 150 to enable gate 152, 154 or 156, respectively. The circuit 158 at the output of up-down counter 144 adds to the number stored in the counter 144 an amount equal to the predetermined distance of the weld from the delivery shear 106 as determined by counter 122, 124 or 126; this predetermined distance, however, does not include the length of the material in storage in the loop car storage area 104, and hence the output of the circuit 158 as applied through any one of the gates 152, 154 or 156 is equal to the actual distance of the weld from the delivery shear 106.

This number is preset into down counter 160, 162 or 164, depending upon which one of the gates 152 through 156 is enabled. Pulses from the tachometer pulse generator P3 are also applied to counters 160, 162 and 164. Thus, after the counter 160, for example, is preset, it counts down to the point where the weld is approaching the delivery shear 106. At this time, a signal is generated on lead 166 to cause a line speed control circuit 172 to slow down the strip in a suitable manner in order that a shearing operation can be performed. The generally same operation occurs for the counters 162 and 164, that is, when they have counted down to the point where the weld is approaching the delivery shear, signals are generated on leads 168 and 170, respectively, to cause the line speed control circuit 172 to slow down the strip in a similar manner in order that a shearing operation can be performed.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. For use with a processing line for strip material including a loop storage area where the length of the material passing through may vary, the combination of means for generating an electrical signal after a point on the strip material entering the processing line reaches a predetermined location with respect to a selected unit of processing equipment in the processing line, said combination including:

first pulse-generating means for producing a first series of pulses proportional in number to the length of strip material entering said loop storage area, second pulse-generating means for producing a second series of pulses proportional in number to the length of strip material leaving said loop storage area, first pulse counter means responsive to said first and second series of pulses for generating a pulse count proportional to the actual length of material stored in said loop storage area, second pulse counter means, first control means actuable before said point on the strip material enters said processing line for presetting into said second pulse counter means the count of said first pulse counter means plus a constant, second control means for applying said second series of pulses to said second pulse counter means whereby the count of said second counter means decreases as said point progresses through said processing line from said loop storage area to said piece of processing equipment, and third control means for deriving from said second pulse counter means said electrical signal indicating that said point has reached said predetermined location with respect to said piece of processing equipment.

2. The combination of claim 1, wherein said selected unit of processing equipment comprises a temper mill and said point on the strip material coincides with a weld securing the trailing end of a length of strip material to the forward end of the next succeeding length, and including mill control means responsive to said electrical signal for separating the rolls of said temper mill.

3. The combination of claim 1, wherein said selected unit of processing equipment comprises a pickle tank and said point on the strip material coincides with a weld securing the trailing end of a length of strip material to the forward end of a succeeding length, and including side guides for the strip material passing through said pickle tank, and guide control means responsive to said electrical signal for separating said side guides.

4. The combination of claim 1, wherein said processing line includes an entrance loop storage area and an exit loop storage area, with each of said loop storage areas being provided with first and second pulse generating means and first pulse counter means for determining the length of the material in said entrance and exit loop storage areas.

5. The combination of claim 4, including two second pulse counters for said exit loop storage area, gate means connecting the second pulse counters to the first pulse counter means for said exit loop storage area whereby the second pulse counters can be preset by signals from said first pulse counter means for the exit loop storage area, and means coupled to pulse counter means of said entrance loop storage area for enabling said gate means.

6. In a processing line of the type in which strip material passes through a loop storage area where the length of the material passing through may vary, the combination of means for generating an electrical signal after a point on the strip material entering said loop storage area leaves said loop storage area, said combination comprising:

first pulse-generating means for producing a first series of pulses proportional in number to the length of strip material entering said loop storage area, second pulse-generating means for producing a second series of pulses proportional in number to the length of strip material leaving said loop storage area, an up-down counter responsive to said first and second series of pulses for producing an electrical signal indicative of the instantaneous length of material in said loop storage area, a down counter, means for presetting into said down counter at least the count of said up-down counter before said point enters the loop storage area, means for applying said second series of pulses to said down counter after the count of said up-down counter has been preset therein whereby the count of said down counter decreases as said point progresses through said loop storage area, and means for producing an electrical signal when said down counter has counted down to a value indicating that said point has left the loop storage area.